H. K. FLAGLER & W. E. DODGE.
Pipe-Coupling.

No. 168,733.

Patented Oct. 11, 1875.

Witnesses.
Chas. Felton Pidgin.
Owen H. Weaver.

Inventors.
H. K. Flagler
Walter E. Dodge
by their Attys.
C. D. Wright H. Brown.

UNITED STATES PATENT OFFICE.

HARVEY K. FLAGLER AND WALTER E. DODGE, OF BOSTON, MASSACHUSETTS, ASSIGNORS TO THE NATIONAL TUBE-WORKS COMPANY, OF SAME PLACE.

IMPROVEMENT IN PIPE-COUPLINGS.

Specification forming part of Letters Patent No. 168,733, dated October 11, 1875; application filed August 13, 1875.

*To all whom it may concern:*

Figure 1:
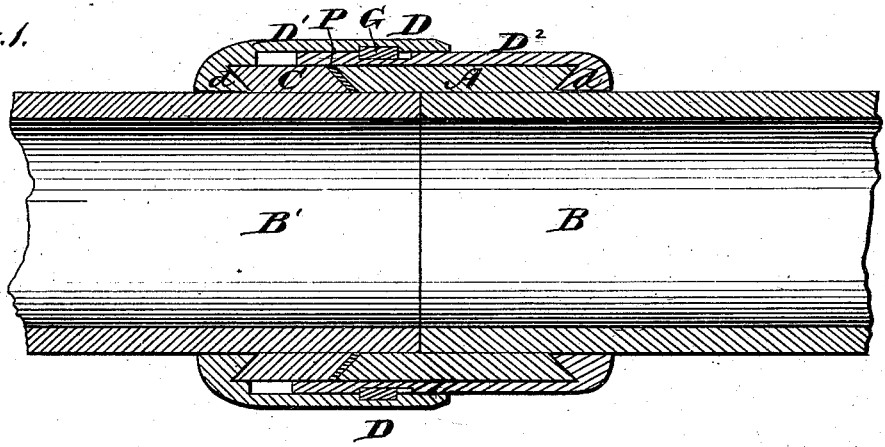
Figure 2:
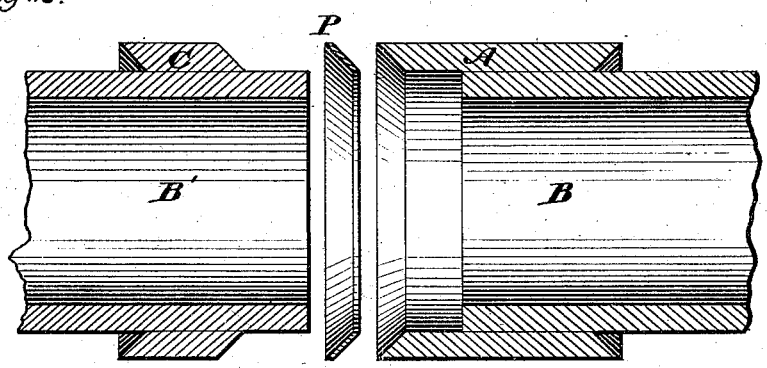
Figure 3:
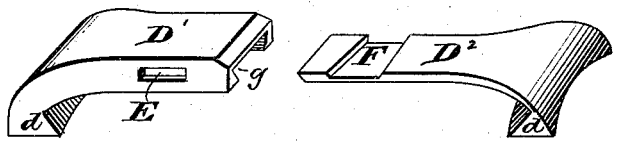
Figure 4:
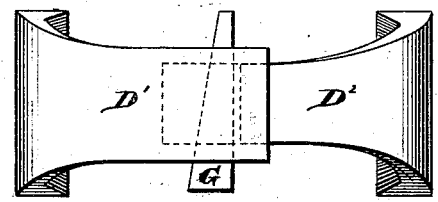

Be it known that we, HARVEY K. FLAGLER and WALTER E. DODGE, of Boston, in the county of Suffolk and State of Massachusetts, have invented certain Improvements in Pipe-Couplings, of which the following is a specification:

In the accompanying drawings, forming a part of this specification, Figure 1 represents a longitudinal section of our invention, showing the parts coupled. Fig. 2 represents a similar section, showing the parts uncoupled. Fig. 3 represents a perspective view, showing the clamp detached and its parts disconnected; and Fig. 4, a top view of the clamp with its parts connected.

This invention has for its object to provide a convenient and simple device for connecting the ends of sections of pipe or tubing without the use of screw-threads, and is applicable particularly to tubing made of thin or sheet metal, on which a screw-thread cannot be cut.

Our invention consists, first, in a coupling composed of a projecting sleeve or socket (having its ends beveled) attached to the end of one section of pipe or tubing, and an abutment-ring (also having its ends beveled) attached to the opposite section of pipe or tubing back of its end, in combination with a clamp or clamps adapted to engage with the outer beveled ends of the coupling formed when the parts are connected, and hold said parts together. It consists, secondly, in the combination, with one coupling, of a packing-ring adapted to fit between the adjacent beveled ends of the parts of the coupling; and, thirdly, in the combination, with our improved coupling, of a particular clamping device, constructed with especial reference to holding the parts of said coupling together, all of which we will now proceed to describe.

In the drawings, A represents the socket, which is composed of a ring, having its ends beveled outwardly, as shown in Fig. 2. This ring is rigidly attached in any desired manner to the end of the pipe-section B, with one end projecting beyond the end of the section. C represents the abutment-ring, which is rigidly attached to the adjacent pipe-section B', at a distance back from the end thereof equal to the distance at which the end of the socket A projects from the end of the section B. The ends of the ring C are beveled in one direction, this bevel being the same as that of the projecting end of the socket A. The sections are coupled by inserting the end of the section B' into the projecting end of the socket A, the beveled end of the latter facilitating the insertion of the end of the section B', and fitting accurately against the correspondingly-beveled end of the abutment-ring, as shown in Fig. 1. If desired, a packing-ring, P, of lead or other suitable material, may be interposed between the adjacent ends of the socket and abutment-ring, this packing being so formed as to fit snugly against said ends. Any suitable device may be employed for clamping or holding the parts A C together; we prefer, however, to employ the clamp D, which is composed of two portions, $D^1$ $D^2$, the outer ends of which are provided with hooks $d$, adapted to engage with the exposed end of the socket A and abutment-ring C, as shown in Fig. 1. The portion $D^2$ of the clamp is dovetailed, and is adapted to be inserted in the dovetailed groove $g$ in the portion $D^1$. The latter is provided with a transverse slot, E, which intersects its dovetailed groove, and the portion $D^2$ is provided with a transverse wedge-shaped recess, F, on its upper side, which recess coincides with the slot E when the parts are connected. G represents a wedge, which is adapted to be driven into the slot E. When the clamp is applied to the socket A and ring C, with its hooks $d$ engaging with the beveled ends of the same, the wedge G is driven into the slot E, and, bearing against one side of the recess F, draws the portion $D^2$ into the portion $D^1$, thereby compressing the packing P, tightening the connection of the parts, and holding them firmly together. Any desired number of clamps may be employed, two being preferable, located on opposite sides of the coupling, as shown in Fig. 1.

This device constitutes a cheap and simple coupling, and is adapted either for pipes made of thin material, such as leaders for rain-water, or for heavier pipes laid in the ground. The sections can be readily uncoupled by knocking out the wedge of each clamp.

We are aware that the patent of D. Jones, granted September 16, 1873, covers a sleeve or socket projecting beyond the end of a pipe-section, and we do not claim this as our invention.

We claim—

1. The coupling consisting of the socket A and the abutment-ring C, applied to the ends of two sections of tubing, and having their ends beveled, as described, in combination with one or more clamps, adapted to engage with the outer beveled ends of the coupling, and hold the parts A C thereof together, substantially as and for the purpose specified.

2. The packing-ring P, combined with the socket A and abutment-ring C, substantially as described.

3. The clamp D, combined with the socket A and abutment-ring C, substantially as and for the purpose specified.

In testimony whereof we have signed our names to this specification in the presence of two subscribing witnesses.

HARVEY K. FLAGLER.
WALTER E. DODGE.

Witnesses:
A. E. DENISON,
C. F. BROWN.